Figure 1:
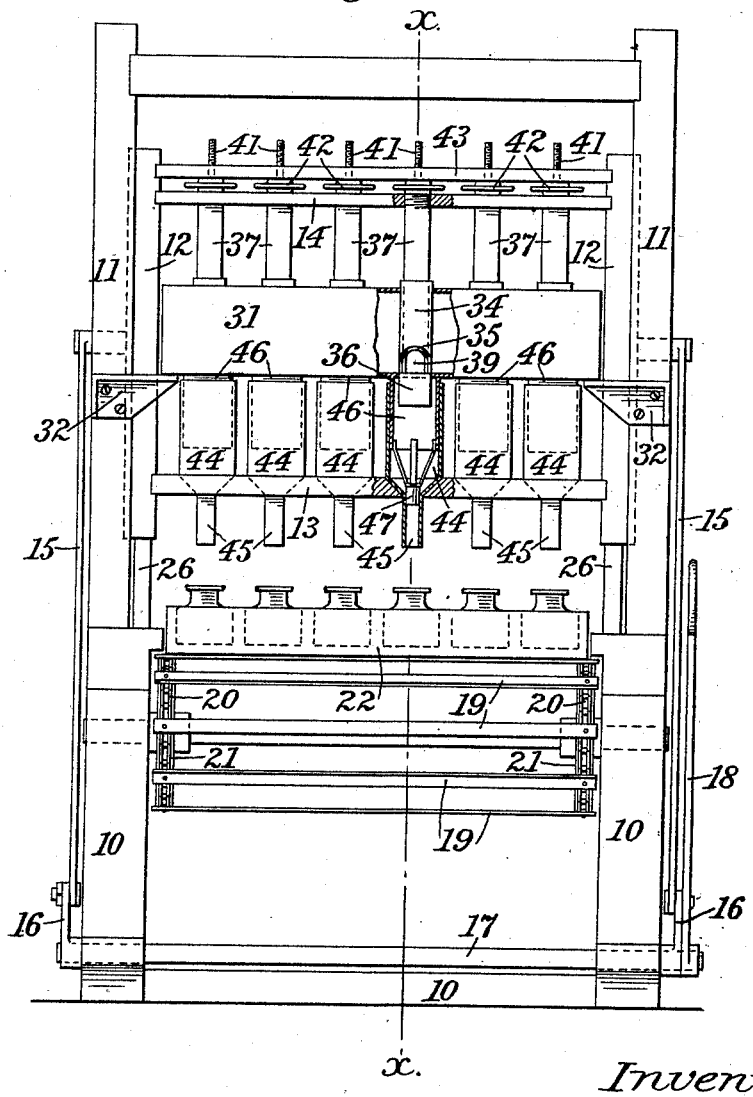

(No Model.) 2 Sheets—Sheet 1.

C. B. & C. H. BEARDSLEY.
BOTTLING APPARATUS.

No. 509,647. Patented Nov. 28, 1893.

Attest:
A. N. Jestora
A. Thdder

Inventors:
Charles B. Beardsley
Charles H. Beardsley
by William B. Greeley
Atty.

(No Model.) 2 Sheets—Sheet 2.
C. B. & C. H. BEARDSLEY.
BOTTLING APPARATUS.
No. 509,647. Patented Nov. 28, 1893.
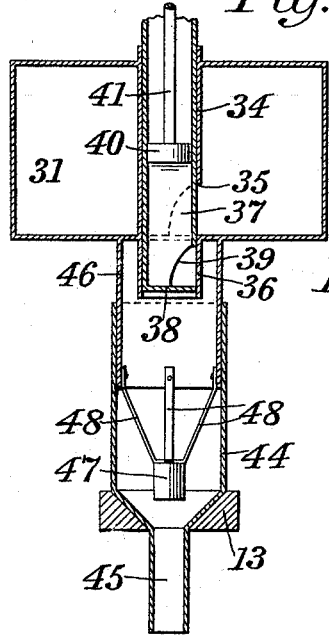
Fig. 3.
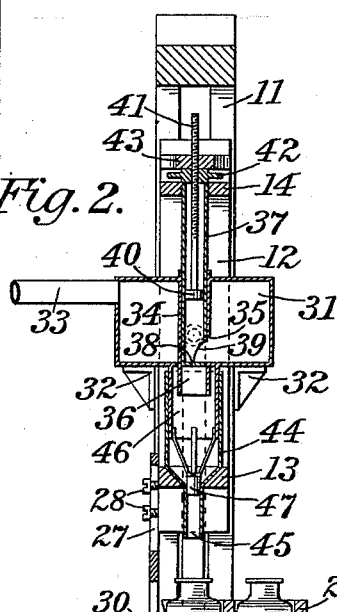
Fig. 2.
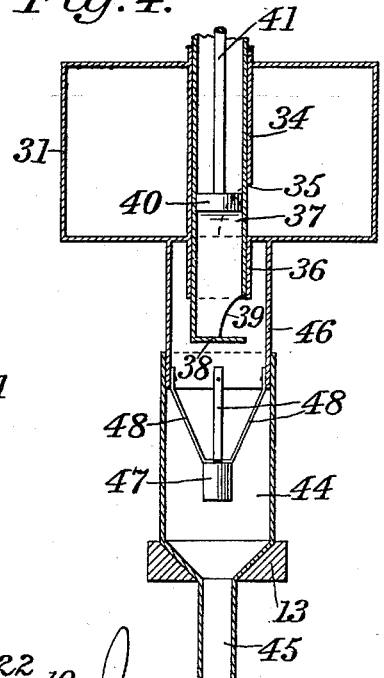
Fig. 4.
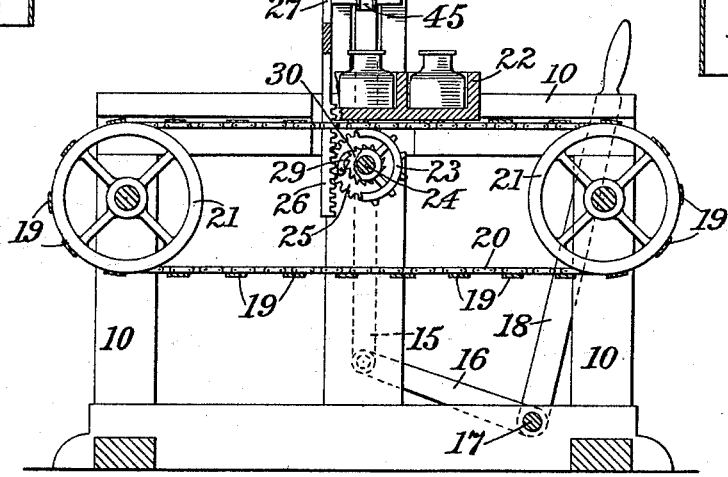
Attest:
A. N. Jesbera
A. Kidder
Inventors:
Charles B. Beardsley
Charles H. Beardsley
by William B. Greeley
Att'y.

UNITED STATES PATENT OFFICE.

CHARLES B. BEARDSLEY AND CHARLES H. BEARDSLEY, OF BROOKLYN, NEW YORK.

BOTTLING APPARATUS.

SPECIFICATION forming part of Letters Patent No. 509,647, dated November 28, 1893.

Application filed April 13, 1893. Serial No. 470,150. (No model.)

*To all whom it may concern:*

Be it known that we, CHARLES B. BEARDSLEY and CHARLES H. BEARDSLEY, both of Brooklyn, in the county of Kings and State of New York, have invented certain new and useful Improvements in Bottling Apparatus; and we do hereby declare that the following is a full and exact description thereof, reference being had to the accompanying drawings, and to the letters of reference marked thereon, making a part of this specification.

This invention relates to bottling machines or apparatus adapted to fill a number of bottles or other similar receptacles, one or more at a time, with great rapidity.

The object is in general to improve the construction and mode of operation of such machines or apparatus and particularly to provide a machine which shall be capable of introducing a measured quantity of liquid into each bottle to be filled and without wasting or spilling the liquid which is to be bottled.

In accordance with the invention the improved machine is provided with one or more fillers each of which, at each operation of the machine, is itself filled with a measured quantity of the liquid and is thereafter caused to discharge its load into a bottle placed to receive it.

Other features of novelty will be described herein and definitely pointed out in the claims.

In the drawings: Figure 1 is a front elevation, partly broken out and partly in vertical section, of a machine which embodies the improvements in a convenient and practical form. Fig. 2 is a vertical section thereof on the line x—x of Fig. 1. Figs. 3 and 4 are detail views, in vertical section and on a larger scale than that of Figs. 1 and 2, showing different positions assumed by certain parts which are also shown in Figs. 1 and 2.

In the machine which has been adopted for illustration a suitable frame 10 supports vertical guides 11, 11, in which a carriage is mounted to reciprocate. The carriage is composed of vertical side pieces 12, 12, a lower cross-bar 13 and an upper cross-bar 14. The side pieces are connected to links 15, 15, which are pivoted to the free ends of arms 16, 16, secured to a shaft 17. A hand lever 18 is fixed to said shaft 17 and affords means by which the operator can effect the proper reciprocation of the carriage 12, 13, 14.

An endless apron, formed of slats 19 and chains 20, is carried by wheels 21 and constitutes a movable support on which the boxes or cases 22, in which the bottles to be filled are placed, may be supported and carried forward from time to time to bring the bottles in succession in position to be filled. The apron may be advanced at each operation of the machine by one or more driving wheels 23, see Fig. 2, which are fixed to a shaft 24 and engage the chains 20. Upon the same shaft are mounted loosely one or more driving gears 25 which are engaged by corresponding racks 26 fixed to the frame 12, 13, 14. In order that the point at which the rack leaves the gear on its upward movement may be varied and the throw of the gear and the advancement of the apron 19, 20, be correspondingly varied when required, the racks 26 are adjustably secured to the frame, being slotted, as shown at 27, to receive screws or bolts 28 which enter the frame. The gear carries a pawl 29 which is adapted to engage a ratchet wheel 30 fixed to the shaft 24, whereby the apron is moved only in one direction.

A tank 31, which is adapted to receive a proper quantity of the liquid to be bottled, is supported in a fixed position by brackets 32 which are secured to the vertical guides 11. The tank is preferably closed at the top and may receive its supply through a pipe 33. One or more tubes 34, having each an opening 35, within the tank are fixed in the tank and extend for a short distance, as at 36, below the bottom of the tank, the lower end of each tube being open to permit the passage of the filling tube hereinafter referred to and the complete discharge of the liquid therefrom. Within each tube 34 the filling tube or filler 37 is adapted to have a snug sliding fit, the filler having a closed bottom 38 and an opening 39 which is just above the bottom 38 and is in line with the opening 35 in the tube 34. Each filler 37 is fixed to the upper cross-bar 14 of the carriage so that it may be reciprocated therewith. Within the filler 37 is placed a piston 40 which is carried by a rod 41. The upper end of the rod is screw-threaded and engaged by a nut 42 above the cross-bar 14, whereby the position of the piston in the filler may be adjusted nicely and the capacity of the filler regulated. A confining bar 43 may be placed above the nuts.

The filler 37 might be arranged to discharge its load directly into the bottle to be filled but preferably a funnel 44 is mounted in the lower cross-bar 13 of the carriage for each filler, the mouth 45 of the funnel being adapted to enter the neck of the bottle to be filled as the carriage is lowered. A sleeve 46 may be attached to the bottom of the tank 31 about each tube 36 and adapted to enter snugly into the upper end of the funnel 44 to prevent slopping or spattering of the liquid as it enters the funnel. A plug 47 is supported by arms 48 attached to the sleeve 46 or to the tank to enter the mouth 45 of the funnel when the latter is in its highest position and thereby prevent drip from the funnel while the bottles are being shifted.

The operation of the machine will now be readily understood. The piston 40 having been adjusted to regulate the capacity of the filler as described, the carriage is raised to its highest point, carrying with it the funnels away from the bottles, causing the mouths of the funnels to be closed by the plugs 47, and raising the filler 37 so that its opening 38 shall register with the openings 35, as shown in Fig. 2, and permit the filler to receive its measured load of liquid. At the same time the bottle carrier is advanced to present another row of bottles to be filled. The descent of the carriage now commences and the funnels are lowered toward the bottles and away from the plugs while the filler descends so that its aperture 39 is completely covered by the portion 36 of the tube 34, whereby the flow of liquid into the filler is entirely cut off before the discharge from the filler can begin. As the ascent of the carriage continues the mouths of the funnels enter the necks of the bottles and the opening 39 of the filler passes below the portion 36 of the tube 34 and permits the measured quantity of liquid to escape therefrom into the funnel and into the bottle.

It is obvious that without departing from the spirit of our invention the form and arrangement of the parts may be varied, as, for instance, by supporting the fillers on a fixed frame and causing the tank to be moved with respect thereto. Other changes also will readily suggest themselves.

We claim as our invention—

1. In a bottling machine, the combination with a tank to receive the liquid to be bottled, of a filler having a single opening just above its lower end and movable into and out of said tank and a reciprocating carriage to which said filler is attached, whereby the filler may be moved into the tank to be filled and out of the same to permit its load to be discharged completely.

2. In a bottling machine, the combination with a tank to receive the liquid to be bottled, of a filler adapted to slide through said tank, a funnel below the filler to receive the liquid from the filler and conduct it to the bottle to be filled, and a carriage to raise and lower the filler and the funnel.

3. In a bottling machine, the combination with a tank, of a filler, a funnel to receive the liquid from the filler and conduct it to the bottle to be filled, a plug to close said funnel, and means to move said filler into the tank to be filled and from the tank to discharge its load into the funnel and to cause said plug to close and open the outlet of the funnel.

4. In a bottling machine, the combination with a tank to receive the liquid to be bottled, a tube fixed in said tank and having an open end and a lateral opening, a filling tube adapted to slide in said fixed tube and having a closed end and a lateral opening just above the closed end and in line with the lateral opening in said fixed tube, and a reciprocating carriage to which said filling tube is attached, whereby the filling tube may be moved in said fixed tube to present its lateral opening to the lateral opening in the fixed tube to receive the liquid from the tank and then below the end of said fixed tube to discharge completely the contained liquid.

5. In a bottling machine, the combination with a fixed tank to receive the liquid to be bottled, of a tube fixed in said tank and having an open end and a lateral opening, a filling tube adapted to slide in said fixed tube and having a closed end and a lateral opening in line with the lateral opening in said fixed tube, a reciprocating carriage to which said filling tube is fixed, and a funnel to receive the liquid from the filling tube and also supported by said carriage.

6. In a bottling machine, the combination with a fixed tank to receive the liquid to be bottled, of a tube fixed in said tank and having an open end and a lateral opening, a filling tube adapted to slide in said fixed tube and having a closed end and a lateral opening in line with the lateral opening in said fixed tube, a reciprocating carriage to which said filling tube is fixed, a funnel to receive the liquid from the filling tube and supported by said carriage, and a plug secured by arms to said tank and adapted to close the outlet of the funnel.

7. In a bottling machine, the combination with a vertically reciprocating carriage and filling devices supported thereby, of an endless apron to support the bottles to be filled, a shaft, means to advance said apron by the rotation of said shaft, a gear wheel having a pawl and ratchet connection with said shaft, a rack adapted to engage said gear wheel, and means to secure the same adjustably to said carriage, whereby the support for the bottles may be moved always in one direction and its extent of movement at each reciprocation of the carriage be varied as required.

8. In a bottling machine, the combination with a tank to receive the liquid, of a filling tube, means to move the same into the tank to be filled and from the tank to permit its load to be discharged, and a piston adjustable in said tube to regulate its capacity.

In testimony whereof we have signed our names to this specification in the presence of two subscribing witnesses.

CHARLES B. BEARDSLEY.
   CHARLES H. BEARDSLEY.

Witnesses:
 A. N. JESBERA,
 A. WIDDER.